(12) United States Patent
Kim et al.

(10) Patent No.: US 9,255,985 B2
(45) Date of Patent: Feb. 9, 2016

(54) APPARATUS AND METHOD FOR IDENTIFYING LOCATION INFORMATION USING VISIBLE LIGHT COMMUNICATION AND GPS

(75) Inventors: Do-Young Kim, Hwaseong-si (KR); Eun-Tae Won, Seoul (KR); Sun-Gi Gu, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 134 days.

(21) Appl. No.: 14/123,088

(22) PCT Filed: May 23, 2012

(86) PCT No.: PCT/KR2012/004076
§ 371 (c)(1),
(2), (4) Date: Feb. 24, 2014

(87) PCT Pub. No.: WO2012/165800
PCT Pub. Date: Dec. 6, 2012

(65) Prior Publication Data
US 2014/0200027 A1    Jul. 17, 2014

(30) Foreign Application Priority Data

May 27, 2011    (KR) .................. 10-2011-0050412

(51) Int. Cl.
| | | |
|---|---|---|
| *H04W 64/00* | (2009.01) | |
| *H04W 4/02* | (2009.01) | |
| *G01S 5/16* | (2006.01) | |
| *G01S 1/70* | (2006.01) | |
| *G01S 19/10* | (2010.01) | |
| *G01S 19/48* | (2010.01) | |
| *G01S 11/12* | (2006.01) | |

(52) U.S. Cl.
CPC ... *G01S 5/16* (2013.01); *G01S 1/70* (2013.01); *G01S 19/10* (2013.01); *G01S 19/48* (2013.01); *G01S 11/12* (2013.01)

(58) Field of Classification Search
CPC ............. A61B 5/1112; G08B 21/0269; G08B 21/0272
USPC ........ 455/456.1; 340/539.13, 539.21, 538.11; 356/614; 398/128, 130
See application file for complete search history.

(56) References Cited

U.S. PATENT DOCUMENTS 6,674,400 B1   1/2004  Hynes
2009/0149202 A1  6/2009  Hill et al.

(Continued)

FOREIGN PATENT DOCUMENTS

| JP | 2010-107235 | 5/2010 |
| JP | 2010107235 A * | 5/2010 |
| KR | 10-2011-0017791 | 2/2011 |

OTHER PUBLICATIONS

International Search Report dated Nov. 29, 2012 in connection with International Patent Application No. PCT/KR2012/004076, 3 pages.

(Continued)

*Primary Examiner* — Sharad Rampuria
*Assistant Examiner* — Obidon Bassinan

(57) ABSTRACT

The present disclosure relates to an apparatus and a method for identifying location information by using visible light communication and a GPS (Global Positioning System). The apparatus includes: a GPS signal processor for receiving a GPS signal, and identifying location information; a visible light signal processor for receiving a visible light signal, and identifying location information; a GPS/visible light selector for identifying strengths of signals provided by the GPS signal processor and the visible light signal processor, and controlling an operation of the GPS signal processor and an operation of the visible light signal processor; and a location information output unit for outputting the at least one location information provided by the GPS signal processor and the visible light signal processor.

33 Claims, 8 Drawing Sheets

(56) References Cited

U.S. PATENT DOCUMENTS

2009/0284366 A1* 11/2009 Haartsen .................. G01S 1/70
340/531
2011/0038638 A1    2/2011 Son et al.
2011/0156925 A1*  6/2011 Lee ..................... H04B 10/116
340/905

OTHER PUBLICATIONS

Written Opinion of International Searching Authority dated Nov. 29, 2012 in connection with International Patent Application No. PCT/KR2012/004076, 4 pages.

* cited by examiner

APPARATUS AND METHOD FOR IDENTIFYING LOCATION INFORMATION USING VISIBLE LIGHT COMMUNICATION AND GPS

CROSS-REFERENCE TO RELATED APPLICATION(S)

The present application claims priority under 35 U.S.C. §365 to International Patent Application No. PCT/KR2012/004076 filed May 23, 2012, entitled "APPARATUS AND METHOD FOR IDENTIFYING LOCATION INFORMATION BY USING VISIBLE LIGHT COMMUNICATION AND GPS". International Patent Application No. PCT/KR2012/004076 claims priority under 35 U.S.C. §365and/or 35U.S.C. §119(a) to Korean Patent Application No. 10-2011-0050412 filed May 27, 2012and which are incorporated herein by reference into the present disclosure as if fully set forth herein.

TECHNICAL FIELD

The present invention relates to an apparatus for identifying location information, and more particularly to an apparatus for accurately measuring the location of a mobile terminal in an area where a GPS (Global Positioning System) signal cannot be received.

BACKGROUND ART

A location tracking method using a GPS has difficulty in obtaining information on positioning tracking according to the movement of a mobile terminal in a room, a floor height, the moving speed of the mobile terminal, etc. in the room by using the GPS.

DISCLOSURE OF INVENTION

Technical Problem

Because a GPS signal cannot be received in a room, another method is required to obtain information on positioning tracking, a floor height and speed.

Particularly, because a GPS signal cannot be received in a place such as a tunnel, in order to obtain information on the speed and positioning of a vehicle by using the GPS, another modified method is required.

Solution to Problem

Accordingly, an aspect of the present invention is to solve the abovementioned problems, and to provide an apparatus capable of accurately measuring the location of a mobile terminal in an area where a GPS signal cannot be received.

In accordance with an aspect of the present invention, an apparatus for identifying location information is provided. The apparatus includes: a global positioning system (GPS) signal processor for receiving a GPS signal, and identifying location information; a visible light signal processor for receiving a visible light signal, and identifying location information; a GPS/visible light selector for identifying strengths of signals provided by the GPS signal processor and the visible light signal processor, and controlling an operation of the GPS signal processor and an operation of the visible light signal processor; and a location information output unit for outputting the at least one location information provided by the GPS signal processor and the visible light signal processor.

In accordance with an aspect of the present invention, a method for ~is provided.

The method includes: receiving a visible light communication signal including control information from a visible light communication module fixed at a predetermined location; detecting control information from the visible light communication signal; identifying time information indicating a period of time, during which a mobile terminal moves from an area, where a first visible light communication module is located, to an area, where a second visible light communication module is located, by using trigger information included in the control information; identifying distance information indicating a movement distance of the mobile terminal, by using distance vector information included in the control information; and identifying speed information of the mobile terminal by using the time information and the distance information.

Advantageous Effects of Invention only when the visible light communication module receives a request from the mobile terminal according to the present invention, it transmits a visible light signal for identifying location information, or initiates an operation for transmitting a visible light signal. Accordingly, it is possible to reduce the unnecessary use of communication resources or the unnecessary consumption of electric power.

Also, a location tracking apparatus according to the present invention, can accurately measure the location of a mobile terminal even in an area where a GPS signal cannot be received.

BRIEF DESCRIPTION OF DRAWINGS

The above and other exemplary features, aspects, and advantages of the present invention will be more apparent from the following detailed description taken in conjunction with the accompanying drawings, in which.

MODE FOR THE INVENTION

Hereinafter, exemplary embodiments of the present invention will be described with reference to the accompanying drawings. The following description includes specific details, and the specific details are only provided in order to help a more comprehensive understanding of the present invention. Therefore, it will be apparent to a person having ordinary knowledge in the technical field that predetermined changes and modifications can be made in the specific details without departing from the scope of the present invention.

Figure 1:
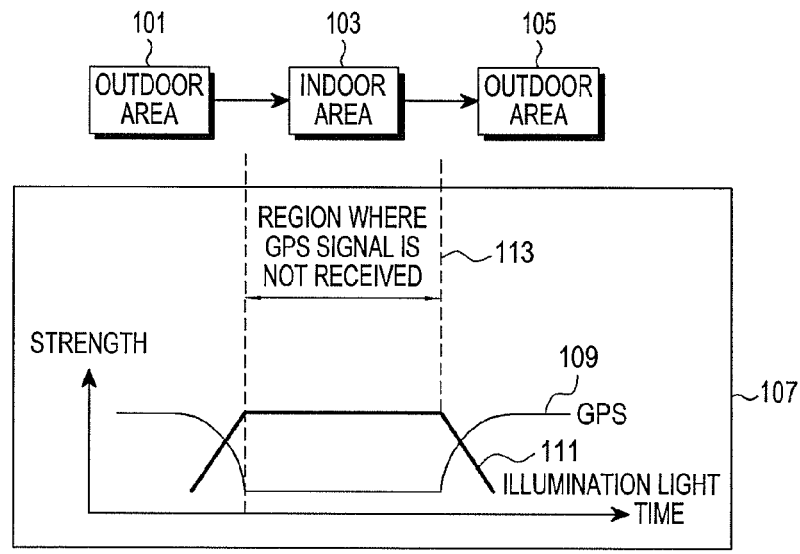
FIG. 1 is a conceptual view showing the state of a signal received during the movement of an apparatus for identifying location information according to an embodiment of the present invention.

FIG. 1 is a conceptual view showing the state of a signal received during the movement of an apparatus for identifying location information according to an embodiment of the present invention.

FIG. 1 shows a process where a mobile terminal first enters an indoor area 103, such as a tunnel or a building, from an outdoor area 101 and then again passes through an outdoor area 105. A graph 107 shown in FIG. 1 shows the strength of a GPS signal 109 and the strength of an illumination light signal 111, which change when the mobile terminal first enters the indoor area 103 from the outdoor area 101 and then again passes to the outdoor area 105.

When the mobile terminal enters the indoor area 103 from the outdoor area 101, the GPS signal 109 has a signal strength which is weak or blocked, and thus the mobile terminal fails to receive GPS information. Accordingly, within a region 113 where the mobile terminal is located indoors, the GPS signal 109 is weak. In contrast, within a region corresponding to a case where the mobile terminal enters the outdoor area 105 from the indoor area 103, the GPS signal 109 has such a strength that the mobile terminal can again receive the GPS signal. The illumination light signal 111 has an increasing strength when the mobile terminal enters the indoor area 103 from the outdoor area 101. Accordingly, when a visible light source device installed in a tunnel or a building supports a communication function, a mobile terminal may receive a visible light signal by using the visible light source device installed in the tunnel or the building.

Figure 2:
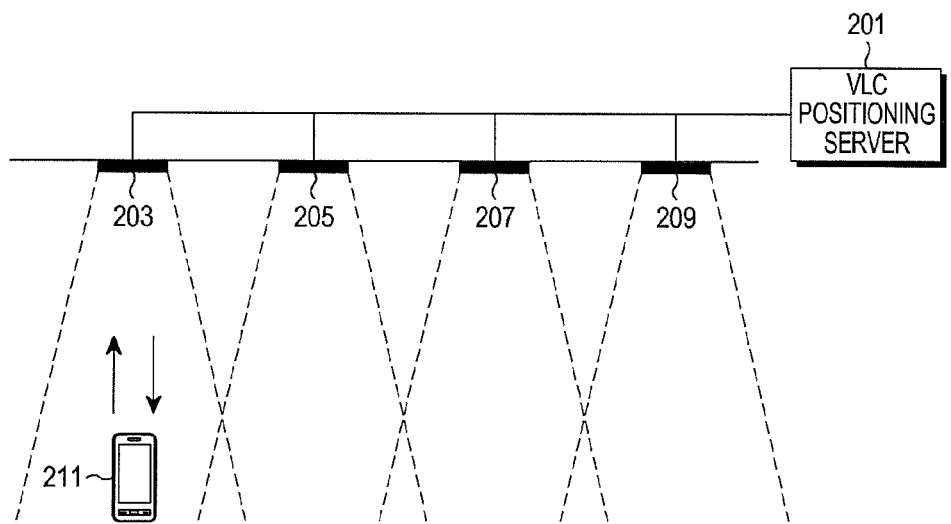
FIG. 2 is a conceptual view showing a process of identifying the location of a mobile terminal during indoor movement of an apparatus for identifying location information according to an embodiment of the present invention.

FIG. 2 is a conceptual view showing a process of identifying the location of a mobile terminal during indoor movement of an apparatus for identifying location information according to an embodiment of the present invention. When a mobile terminal 211 moves, each of light sources 203,205,207 and 209 recognizes the location of the mobile terminal 211 in such a manner as to first recognize the location of the mobile terminal and then transmit an ID of each of the light sources 203,205,207 and 209. The VLC (Visible Light Communication) positioning server 201 transmits positioning information on a location, in which the mobile terminal 211 is located with respect to the light sources 203,205,207 and 209, to the mobile terminal 211. Accordingly, the mobile terminal 211 recognizes positioning at which it is currently located. However, this positioning allows a report of only an ID of each of the light sources 203,205,207 and 209, which corresponds to a location, in which the mobile terminal 211 is located. Accordingly, actually, this positioning does not allow GPS information reporting that the mobile terminal 211 is located outdoors to be transmitted to the VLC positioning server 201. Also, in order to recognize a location to which the mobile terminal 211 has moved, the mobile terminal 211 transmits a backward signal to the light sources 203,205,207 and 209 in response to a forward signal transmitted by the light sources 203,205,207 and 209, and recognizes location information thereof. As a result, when the mobile terminal 211 cannot perform bidirectional communication with the light sources 203,205,207 and 209, the mobile terminal 211 may not identify location information. Also, a navigation system using a GPS uses only a GPS forward signal instead of bidirectional signals. Accordingly, in order to obtain effects identical to those in an actual GPS environment, it is necessary to modify a conventional visible light communication system.

Figure 3:
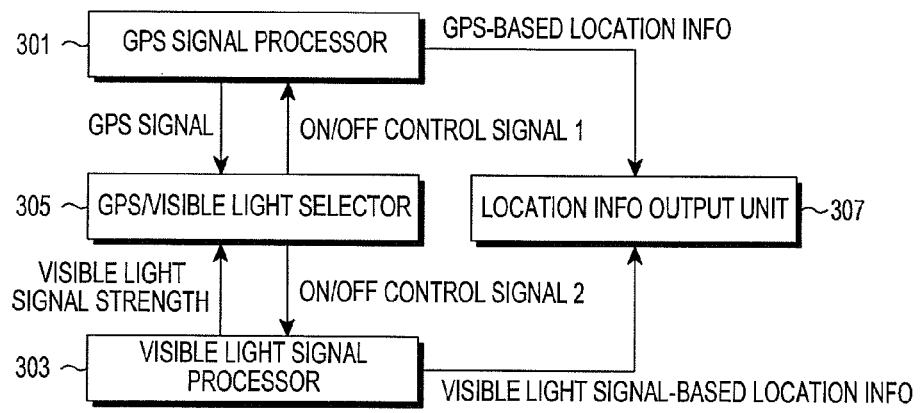
FIG. 3 is a block diagram showing the configuration of an apparatus for identifying location information according to an embodiment of the present invention.

FIG. 3 is a block diagram showing the configuration of an apparatus for identifying location information according to an embodiment of the present invention. Referring to FIG. 3, an apparatus for identifying location information according to an embodiment of the present invention includes: a GPS signal processor 301 for receiving a GPS signal and identifying location information; a visible light signal processor 303 for receiving a visible light signal and identifying location information; a GPS/visible light selector 305 for identifying strengths of signals provided by the GPS signal processor 301 and the visible light signal processor 303, and controlling an operation of the GPS signal processor 301 and an operation of the visible light signal processor 303; and a location information output unit 307 for outputting the at least one location information provided by the GPS signal processor 301 and the visible light signal processor 303.

Figure 4:
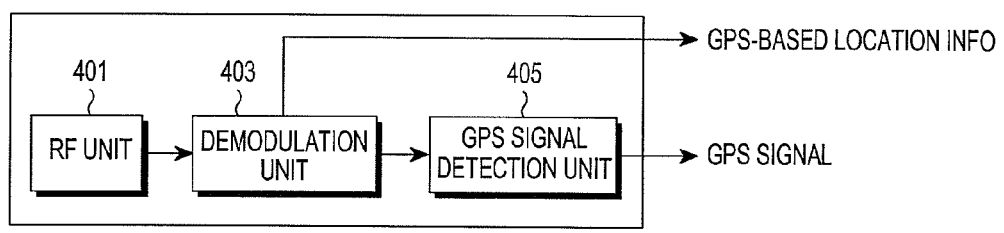
FIG. 4 is a block diagram showing a detailed configuration of a GPS signal processor as shown in FIG. 3.

FIG. 4 is a block diagram showing a detailed configuration of a GPS signal processor as shown in FIG. 3. Referring to FIG. 4, a GPS signal processor 400 includes an RF (Radio Frequency) unit 401 for extracting received GPS signal information, a demodulation unit 403 for demodulating a received signal, and a GPS signal detection unit 405 for detecting the strength of the received GPS signal. The demodulation unit 403 detects location information from a GPS signal transmitted from a GPS satellite, and provides the detected location information to the location information output unit 307. Also, the GPS signal detection unit 405 detects GPS signal strength of the signal received by the RF unit 401, and provides the detected GPS signal strength to the GPS/visible light selector 305.

Figure 5:
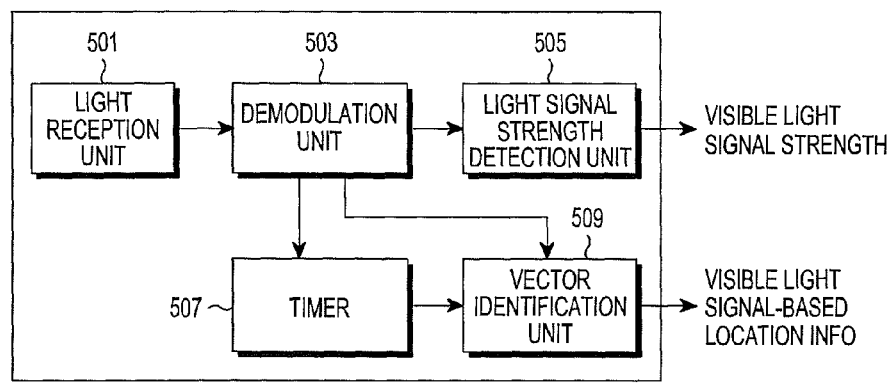
FIG. 5 is a block diagram showing a detailed configuration of a visible light signal processor as shown in FIG. 3.

FIG. 5 is a block diagram showing a detailed configuration of a visible light signal processor as shown in FIG. 3. Referring to FIG. 5, a visible light signal processor 500 includes: a light reception unit 501 for receiving a visible light signal, and converting the received visible light signal into an electrical signal; a demodulation unit 503 for demodulating the received signal; a light signal strength detection unit 505 for detecting the strength of the light signal that the light reception unit 501 has received and has delivered to a demodulation unit 503; a timer 507 for detecting a timer trigger signal or a timer completion signal from the demodulated signal, and counting time; and a vector identification unit 509 for identifying a movement vector by using information included in the demodulated signal and/or time information provided by the timer.

The light signal strength detection unit 505 provides the detected strength of the light signal to the GPS/visible light selector 305, and the vector identification unit 509 provides the identified movement vector to the location information output unit 307. Then, the location information output unit 307 may first reflect the movement vector with location information, which has lastly been provided by the GPS signal processor 301, as reference, and may then output the generated location information. Otherwise, the location information output unit 307 may first reflect location information (for example, a latitude, a longitude, an elevation, etc.), which is included in the received visible light signal, with the location information, which has lastly been provided by the GPS signal processor 301, as reference, and may then output the generated location information.

Figure 6:
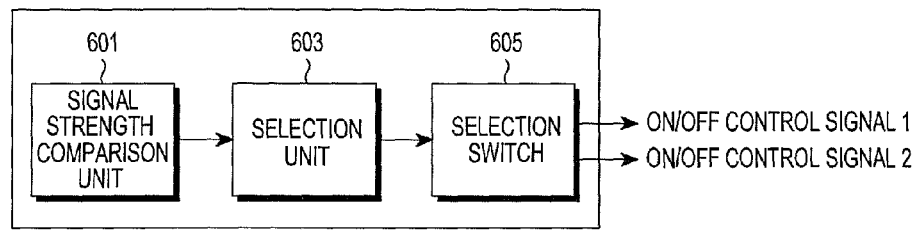
FIG. 6 is a block diagram showing a detailed configuration of a GPS/visible light selector as shown in FIG. 3.

FIG. 6 is a block diagram showing a detailed configuration of a GPS/visible light selector as shown in FIG. 3. Referring to FIG. 6, a GPS/visible light selector 600 includes a signal strength comparison unit 601, a selection unit 603, and a selection switch 605.

The signal strength comparison unit 601 compares each of the strength of a GPS signal received from the GPS signal detection unit 405 and the strength of a light signal received from the light signal strength detection unit 505 with a predetermined reference value. When the strength of the GPS signal is less than the predetermined reference value, a visible light communication module is operated. Otherwise, when the strength of the visible light signal is less than the predetermined reference value, a GPS communication module is operated. Otherwise, when the strength of the GPS signal is equal to or greater than the predetermined reference value and the visible light communication module does not meet a reference value, a GPS communication module is operated. Otherwise, when the visible light signal is equal to or greater than the predetermined reference value and the GPS communication module does not meet a reference value, the strength of the visible light signal is first compared with the strength of the GPS signal when the visible light communication module is operated, and then information on a result of the comparison is delivered to the selection unit 603. The selection unit 603 selects the GPS signal processor 301 or the visible light signal processor 303 by using the selection switch 605. Namely, the selection switch 605, the output of which is selected by the control of the selection unit 603, outputs an ON/OFF control signal 1 which is input to the GPS signal processor 301, or outputs an ON/OFF control signal 2 which is input to the visible light signal processor 303.

Figure 7:
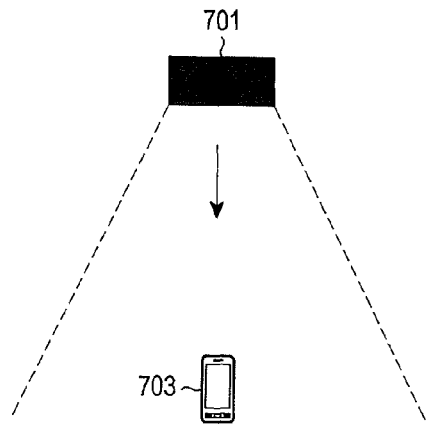
FIG. 7 is a first conceptual view illustrating a process of identifying location information by an apparatus for identifying location information according to an embodiment of the present invention.

FIG. 7, which is a first conceptual view illustrating a process of identifying location information by an apparatus for identifying location information according to an embodiment of the present invention, illustrates a process of providing GPS information by using a memory.

A light source 701, which is installed indoors and includes a visible light communication module capable of performing visible light communication, includes a memory in the visible light communication module. The memory previously stores location information (for example, a latitude, a longitude, an elevation, etc.) of an area where the light source 701 is located. Accordingly, when the light source 701 transmits the location information (for example, a latitude, a longitude, an elevation, etc.) at every predetermined time interval, the mobile terminal 703 passing through an area where visible light is irradiated by the light source 701 may receive the location information through visible light communication with the light source 701. Therefore, the visible light signal processor included in the mobile terminal 703 may first detect the location information, and may then provide the detected location information to the location information output unit 307 (see FIG. 3). Next, the location information output unit 307 may first express the location information together with map data in the form of graphics, and may then output the location information expressed in the form of graphics.

Figure 8:
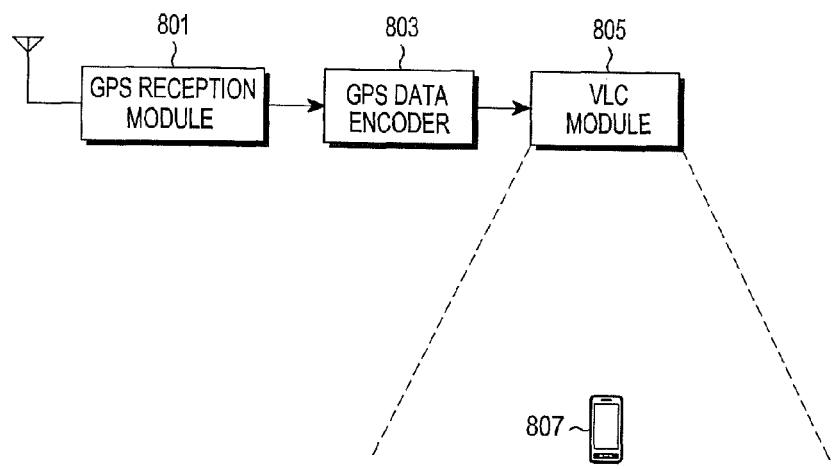
FIG. 8 is a second conceptual view illustrating a process of identifying location information by an apparatus for identifying location information according to an embodiment of the present invention.

FIG. 8, which is a second conceptual view illustrating a process of identifying location information by an apparatus for identifying location information according to an embodiment of the present invention, illustrates a process of detecting a movement vector in a room and reflecting the detected movement vector with location information, which is provided by a GPS signal, as reference.

First, a GPS reception module 801 for receiving a GPS signal from a GPS satellite and a GPS data encoder 803, are installed outdoors. Also, a VLC module 805 which is connected to the GPS data encoder 803 and may perform visible light communication, is installed indoors.

The GPS reception module 801 receives the GPS signal from the GPS satellite, detects location information (for example, DMS information on a latitude and a longitude) included in the GPS signal, and transmits the detected location information to the GPS data encoder 803. Then, the GPS data encoder 803 encodes the location information (for example, DMS information on a latitude and a longitude) to data for visible light communication, and transmits the data for visible light communication to the VLC module 805. Next, the VLC module 805 outputs control information, which includes the location information (for example, DMS information on a latitude and a longitude) and information required to measure a location in a room, through a light source. Accordingly, a mobile terminal 807 passing through an area where visible light is irradiated by the light source receives the control information, and identifies positioning.

The control information may be illustrated in Table 1 below.

TABLE 1

| field | value |
|---|---|
| Optical ID (area ID) | 1 bytes |
| trigger | 10: time trigger |
| | 01: elevation trigger |
| | 11: time and elevation trigger |
| | 00: trigger off |
| distance vector | 2 bytes |
| elevation vector (and floor info) | 2 bytes |
| | (1 byte: elevation, 1 byte: floor) |
| DMS vector | 3 bytes |
| VLC enabler | 1: start point |
| | 0: end point |

The control information may include an optical ID (area ID), a trigger field (trigger), a distance vector field (distance vector), an elevation vector field (elevation vector (and floor info)), a DMS (Degrees, Minutes and Seconds) vector field (DMS vector), and a VLC enabler field (VLC enabler).

The optical ID is an IDentifier (ID) address of a light source used to discriminate between light sources. When only a simple area is represented without using the optical ID, only a number representing a simple area ID may be assigned and used. When only control information itself is needed without an area ID, the optical ID or the area ID do not have to be used, as the need arises.

The trigger field is used to represent a time trigger (10) indicating the initiation of operation of a timer, an elevation trigger (01) for reporting elevation information, a time/elevation trigger (11) indicating the initiation of identification of the timer and the elevation information, and a timer completion trigger (00) indicating the completion of the identification operation of the timer and the elevation information.

Also, the distance vector field represents a distance between light sources. The elevation vector field reports the elevation of a floor height at which a light source is located. The DMS vector field represents DMS information corresponding to degrees/minutes/seconds information needed by the GPS.

Further, the VLC enabler field includes information for coercively initiating a visible light mode or coercively turning off it. For example, a light source which is first located in a room, may set the VLC enabler field to 1, and a light source which is located last in the room, may set the VLC enabler field to 0.

Figure 9:
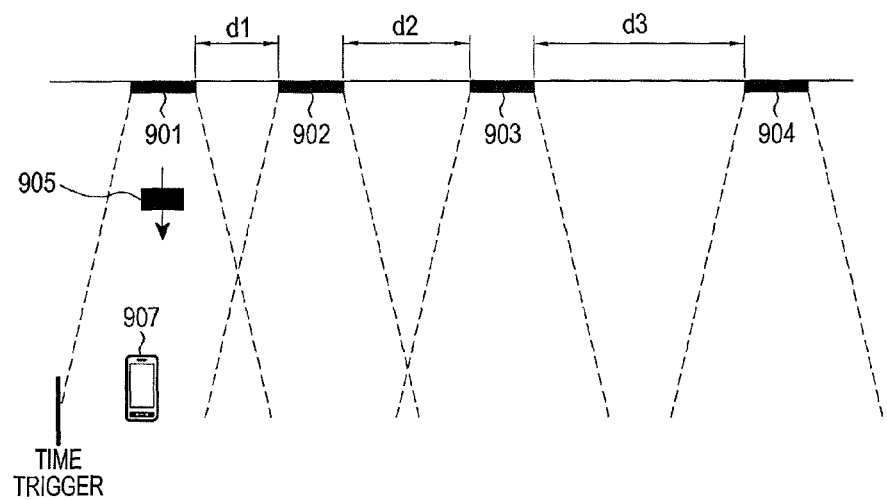
FIG. 9 is a conceptual view illustrating the relation between an apparatus for identifying location information and a visible light communication module, according to an embodiment of the present invention.

FIG. 9 is a conceptual view illustrating the relation between an apparatus for identifying location information and a visible light communication module, according to an embodiment of the present invention.

First, visible light communication modules 901, 902, 903 and 904 which are to be installed indoors, are spaced and installed at predetermined distances d1 and d2 from each other. A mobile terminal 907 passing through an area where visible light is irradiated by each of the light sources, may identify positioning by using control information 905 provided by the relevant visible light communication module among the visible light communication modules 901, 902, 903 and 904.

Figure 10:
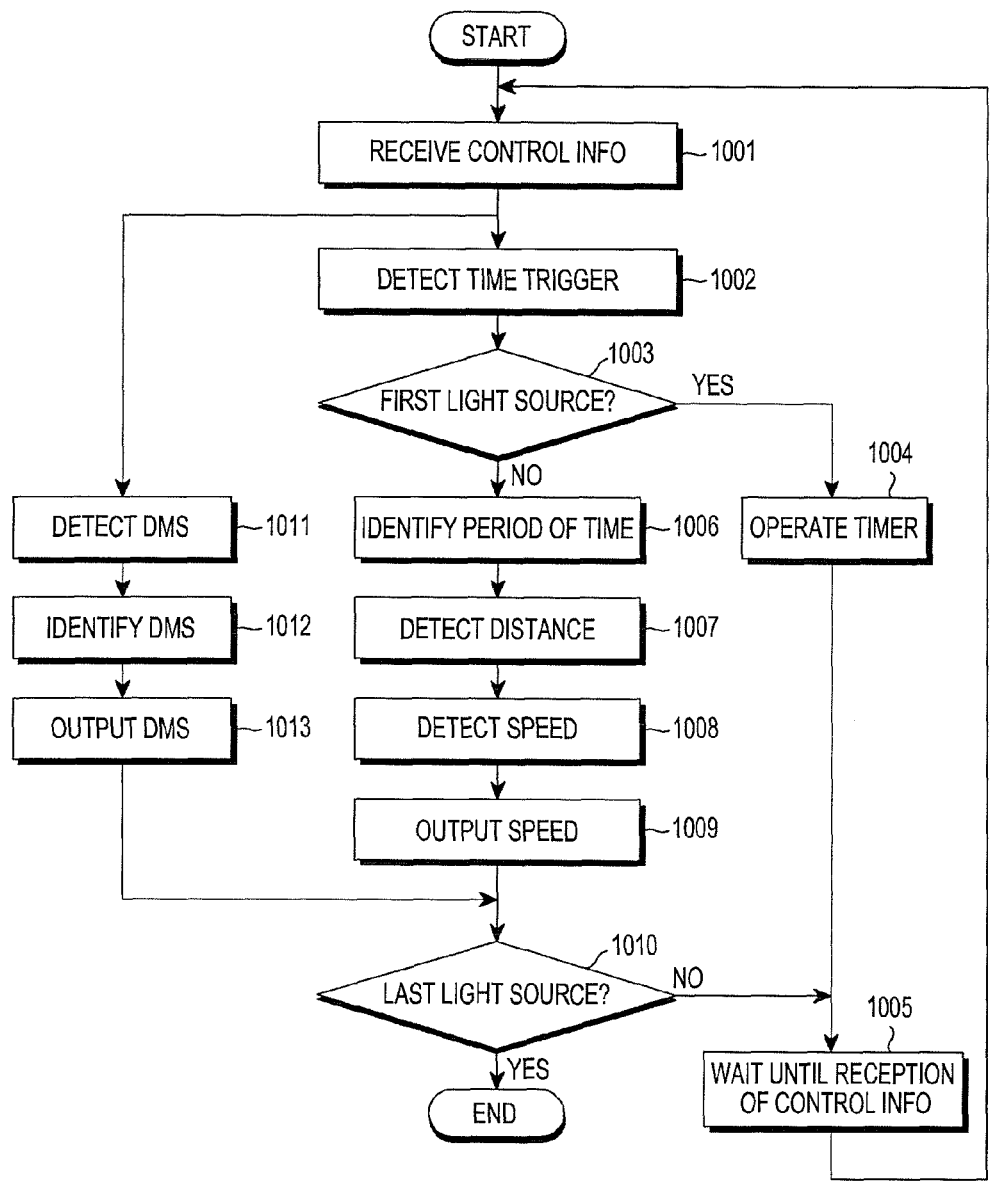
FIG. 10 is a flowchart showing the order of a method for identifying location information according to an embodiment of the present invention.

FIG. 10 is a flowchart showing the order of a method for identifying location information according to an embodiment of the present invention.

First, the GPS/visible light selector 305 (see FIG. 3) included in the apparatus for identifying location information according to the present invention receives a GPS signal from the GPS signal processor 301 for providing location information, receives a visible light signal from the visible light signal processor 303, and compares the strength of the received GPS signal with that of the received visible light signal. In response to conditions where the strength of the visible light signal shows a value greater than that of the GPS signal, as the mobile terminal 907 including the apparatus for identifying location information according to the present invention enters a room, the GPS/visible light selector 305 completes the operation of the GPS signal processor 301 and operates the visible light signal processor 303 by using an on/off control signal 1 and an on/off control signal 2. Accordingly, the visible light signal processor 500 (see FIG. 5) receives control information 905 transmitted by the first visible light communication module 901 (step 1001).

Then, the demodulation unit 503 included in the visible light signal processor 500 identifies the value of a trigger field of the control information 905, and detects a first time trigger from the value of the trigger field (step 1002).

Then, when the first visible light communication module 901 is a visible light communication module, among the visible light communication modules which are located indoors, with which the mobile terminal 907 including the apparatus for identifying location information first gets in touch, the first visible light communication module 901 does not have a distance by which the mobile terminal 907 including the apparatus for identifying location information has moved, and a period of time which has been required for the movement. Accordingly, it is necessary to identify whether the relevant visible light communication module is located first among the visible light communication modules which are located indoors, or whether the relevant visible light communication module is located last thereamong, or whether is located between the first visible light communication module and the last visible light communication module. Accordingly, in step 1003, when the value of a time trigger is set as 10 and the timer is not operating, the vector identification unit 509 included in the visible light signal processor 500 determines that the relevant visible light communication module is located first among the visible light communication modules which are located indoors, and proceeds to step 1004. Then, when the value of the time trigger is set as 10 and the timer is operating, the vector identification unit 509 included in the visible light signal processor 500 determines that the relevant visible light communication module is not located first among the visible light communication modules which are located indoors, and proceeds to step 1006.

In step 1004, the first visible light communication module 901 is a visible light communication module, among the visible light communication modules which are located indoors, with which the mobile terminal 907 including the apparatus for identifying location information first gets in touch. Accordingly, on the assumption that the previous light source does not exist, the timer 507 included in the visible light signal processor 500 is operated.

Then, in step 1005, until the visible light signal processor 500 receives the control information from the second visible light communication module 902 which is located after the first visible light communication module 901, the visible light signal processor 500 waits for the reception of a visible light communication signal. Then, when the control information is received from the second visible light communication module 902 which is located after the first visible light communication module 901, the steps 1001 to 1003 are repeatedly performed.

When a time trigger is detected in a state where the timer 507 is operating, in step 1006, by identifying the value of the timer 507 at a time point of detecting the time trigger, the vector identification unit 509 identifies a period of time, during which the mobile terminal 907 including the apparatus for identifying location information has moved from an area, where the first visible light communication module 901 is located, to an area where the second visible light communication module 902 is located.

In step 1007, from control information 905 transmitted by another visible light communication module (e.g. the visible light communication module 902), which is located indoors, other than the first visible light communication module 901, the vector identification unit 509 identifies a distance vector (or elevation vector (and floor info)) field, and detects the value of a first distance vector field.

In step 1008, the vector identification unit 509 identifies the speed of the mobile terminal 907 including the apparatus for identifying location information by using the period of time identified in step 1006. Namely, herein, first distance vector information represents a distance between the previous visible light communication module (e.g. the first visible light communication module 901) and the current visible light communication module (e.g. the second visible light communication module 902). Accordingly, by dividing the first distance vector information by the period of time, the speed of the mobile terminal 907 including the apparatus for identifying location information is calculated.

A speed vector as calculated above is output to the location information output unit 307 (see FIG. 3), in step 1009. Then, the location information output unit 307 first reflects the movement vector (distance, speed, etc.) with the location information, which has been provided by the GPS signal processor, as reference, and then outputs the generated location information.

By repeating the process as described above, a movement vector value of the mobile terminal 907 including the apparatus for identifying location information may be identified by using the time trigger information and the distance vector information.

Further, as illustrated in Tables 2, 3 and 4 below, the distance vector information may first be encoded and then the encoded distance vector information may be transmitted. For example, the distance vector information may be a value obtained by sequentially arranging 3 bits of information indicating a direction (see Table 2), 8 bits of information indicating a distance value (see Table 3), and 2 bits of information indicating a unit of distance (see Table 4). When the next visible light communication module is located at a point 100 m north of the previous visible light communication module, the location thereof may be expressed as 011 1100100 10.

TABLE 2

| direction | bit |
|---|---|
| west | 000 |
| south | 001 |
| east | 010 |
| north | 011 |
| NE | 100 |
| SE | 101 |
| SW | 110 |
| NW | 111 |

TABLE 3

| figure | bit |
|---|---|
| 1 | 0000 |
| 2 | 0001 |
| 3 | 0010 |
| 4 | 0011 |
| 5 | 0100 |
| ... | ... |
| 50 | 110010 |
| ... | ... |
| 100 | 1100100 |
| ... | ... |
| nnnnn | 111111 |

TABLE 4

| unit | bit |
|---|---|
| km | 01 |
| m | 10 |
| cm | 11 |

Meanwhile, in step 1010, the apparatus for identifying location information identifies whether a relevant visible light communication module is located last among the visible light communication modules which are located indoors. By identifying whether the value of a time trigger is set as 00, the vector identification unit 509 included in the visible light signal processor 500 may identify whether the relevant visible light communication module is located last among the visible light communication modules which are located indoors. Namely, when the value of the time trigger is set as 00, a value of 00 represents that no further visible light communication modules exist after the relevant visible light communication module, and thus the operation of the relevant visible light communication module is completed. When the value of the time trigger is set as 10, in order to identify location information of the mobile terminal 907 including the apparatus for identifying location information through the process as described above, the apparatus for identifying location information proceeds to step 1005.

Meanwhile, DMS vector information corresponding to degrees/minutes/seconds information needed by the GPS may have already been input and stored in a memory in an area where each of the light sources included in the visible light communication modules 901, 902, 903 and 904 is located. For example when the first visible light communication module 901 intends to deliver latitude 5d 5m 0.59s by using a DMS vector field as illustrated in Table 1, latitude 5d 5m 0.59s is converted into 10 00000100 000100 0000 111000 by using an encoding table as illustrated in Tables 5, 6, 7 and 8 below, and the converted latitude is stored in a memory included in the first visible light communication module 901. The converted latitude may be inserted to a DMS vector field corresponding to the control information as illustrated in Table 1.

TABLE 5

| direction | bit |
|---|---|
| longitude | 01 |
| latitude | 10 |

TABLE 6

| degree | bit |
|---|---|
| 1 | 0000 0000 |
| 2 | 0001 0000 |
| 3 | 0000 0010 |
| 4 | 0000 0011 |
| 5 | 0000 0100 |
| ... | ... |
| 58 | 0011 1001 |
| 59 | 0011 1000 |
| ... | ... |
| 180 | 1011 0100 |

TABLE 7

| m/s | bit |
|---|---|
| 1 | 000000 |
| 2 | 000001 |
| 3 | 000010 |
| 4 | 000011 |
| 5 | 000100 |
| ... | ... |
| 58 | 111001 |
| 59 | 111000 |
| 60 | 110111 |

TABLE 8

| dec point | bit |
|---|---|
| 0(0.x) | 0000 |
| 1(1.x) | 0001 |
| 2(2.x) | 0010 |
| 3(3.x) | 0011 |
| 4(4.x) | 0100 |
| 5(5.x) | 0101 |
| 6(6.x) | 0110 |
| 7(7.x) | 0111 |
| 8(8.x) | 1000 |
| 9(9.x) | 1001 |

Accordingly, by identifying the DMS vector information of the mobile terminal 907 including the apparatus for identifying location information, the mobile terminal 907 including the apparatus for identifying location information may identify the location information thereof. To this end, the method for identifying location information according to an embodiment of the present invention may further include steps 1011, 1012 and 1013 in order to identify the DMS vector information. Specifically, the vector identification unit 509 detects a DMS vector field (DMS vector) included in the control information (step 1011), and identifies DMS vector information included in the DMS vector field (DMS vector) (step 1012). Then, the vector identification unit 509 outputs the identified DMS vector information to the location information output unit 307 (see FIG. 3), in step 1013.

Therefore, the location information output unit 307 may first express the speed information, which has been output in step 1009, and the location information, which has been output in step 1013, together with map data in the form of graphics, and may then may display the generated location information.

Further, in an embodiment of the present invention, although a case has been described as an example where steps 1011 to 1013 of identifying the DMS vector information are simultaneously performed while steps 1002 to 1009 are performed in order to identify the speed information, the present invention is not limited to this example. For example, both steps 1011 to 1013 and steps 1002 to 1009 may be sequentially performed. Particularly, after step 1002 is performed, steps 1011 to 1013 may first be performed, and then step 1003 may performed.

Figure 11:
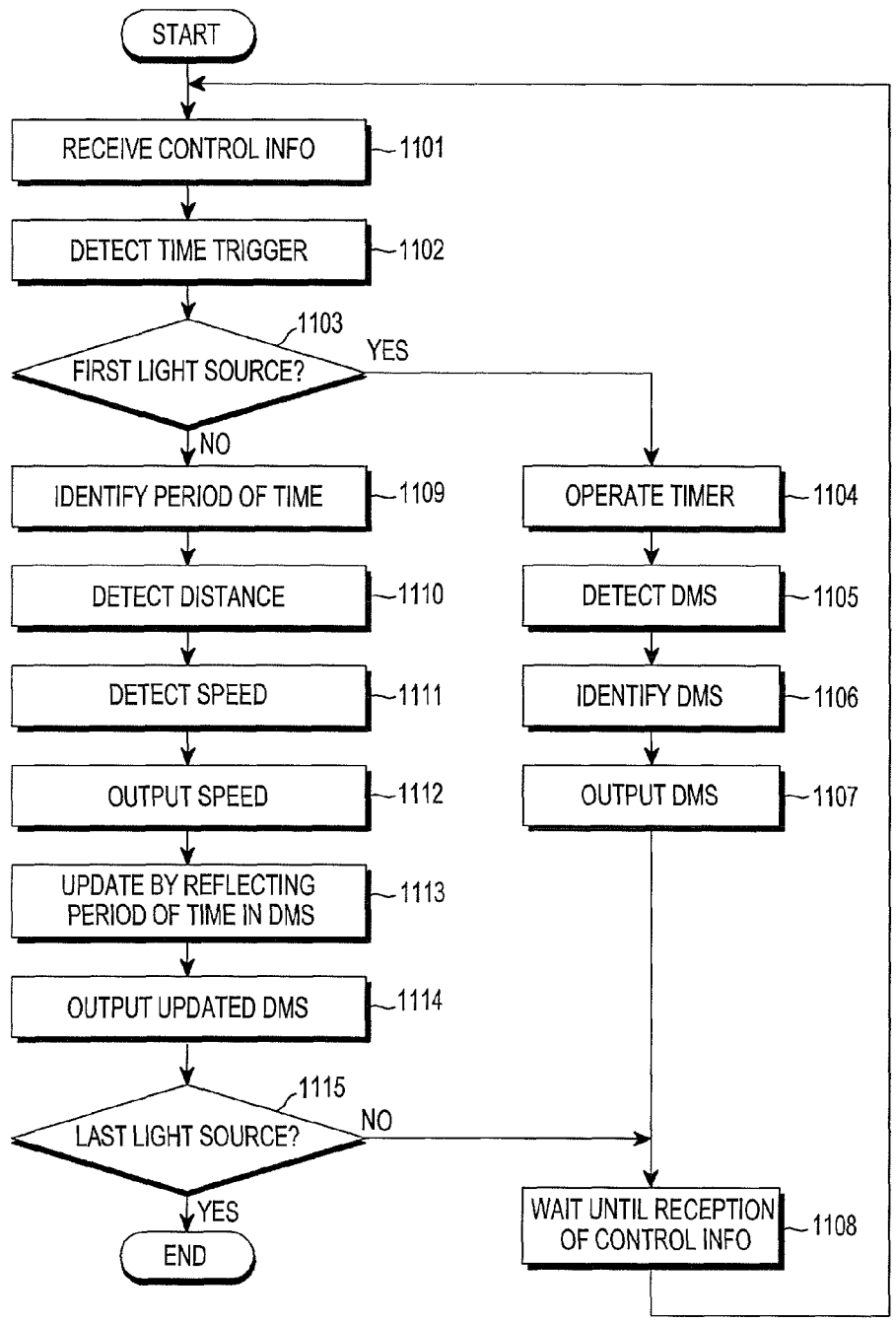
FIG. 11 is a flowchart showing the order of a method for identifying location information according to another embodiment of the present invention.

FIG. 11 is a flowchart illustrating a method for identifying location information according to another embodiment of the present invention.

In the above-described method for identifying location information according to an embodiment of the present invention, a case has been described as an example where DMS vector information corresponding to degrees/minutes/seconds information needed by the GPS has already been input and stored in a memory in an area where each of the light sources included in the visible light communication modules 901, 902, 903 and 904 is located. However, as an alternative to the above-described method, the DMS vector information is stored only in a visible light communication module (e.g. the first visible light communication module 901), which is located first among the visible light communication modules which are located indoors. Also, DMS vector information may be included only in control information provided by the visible light communication module (e.g. the first visible light communication module 901), which is located first among the visible light communication modules which are located indoors. Further, DMS vector information is not included in control information provided by the remaining modules (for example, the second, third and fourth visible light communication modules 902, 903 and 904) excluding the visible light communication module which is located first among the visible light communication modules which are located indoors. Accordingly, each of the remaining modules (for example, the second, third and fourth visible light communication modules 902, 903 and 904) excluding the visible light communication module which is located first among the visible light communication modules which are located indoors may generate DMS vector information by using time information identified by the visible light signal processor 303.

Hereinafter, the operation of a method for identifying location information according to another embodiment of the present invention, which generates DMS vector information by using time information identified by the visible light signal processor 303, will be described in detail with reference to the elements as described above and FIG. 11.

First, similarly to the above-described method for identifying location information according to an embodiment of the present invention, the visible light signal processor 500 (see FIG. 5) receives control information 905 transmitted by the first visible light communication module 901 (step 1101). Then, the demodulation unit 503 included in the visible light signal processor 500 identifies the value of a trigger field of the control information 905, and detects a first time trigger from the value of the trigger field (step 1102). Then, the apparatus for identifying location information identifies whether the first visible light communication module 901 is a visible light communication module, among the visible light communication modules which are located indoors, with which the mobile terminal 907 including the apparatus for identifying location information first gets in touch (step 1103). When the first visible light communication module 901 is a visible light communication module, with which the mobile terminal 907 including the apparatus for identifying location information first gets in touch, the apparatus for identifying location information proceeds to step 1104. In contrast, when the first visible light communication module 901 is not a visible light communication module, with which the mobile terminal 907 including the apparatus for identifying location information first gets in touch, the apparatus for identifying location information proceeds to step 1109. In step 1104, on the assumption that the previous light source does not exist, the timer 507 included in the visible light signal processor 500 is operated.

Then, the vector identification unit 509 detects a DMS vector field (DMS vector) from the control information provided by a visible light communication module (e.g. the first visible light communication module 901), which is located first among the visible light communication modules which are located indoors (step 1105). Next, the vector identification unit 509 identifies DMS vector information included in the DMS vector field (DMS vector), in step 1106. Then, the vector identification unit 509 outputs the identified DMS vector information to the location information output unit 307 (see FIG. 3), in step 1107. Then, in step 1008, until the visible light signal processor 500 receives the control information from the second visible light communication module 902 which is located after the first visible light communication module 901, the visible light signal processor 500 waits for the reception of a visible light communication signal. Then, when the control information is received from the second visible light communication module 902 which is located after the first visible light communication module 901, the steps 1101 to 1103 are repeatedly performed.

When a time trigger is detected in a state where the timer 507 is operating, in step 1109, by identifying the value of the timer 507 at a time point of detecting the time trigger, the vector identification unit 509 identifies a period of time during which the mobile terminal 907 including the apparatus for identifying location information has moved from an area, where the first visible light communication module 901 is located, to an area where the second visible light communication module 902 is located.

In step 1110, from control information 905 transmitted by another visible light communication module (e.g. the visible light communication module 902), which is located indoors, other than the first visible light communication module 901, the vector identification unit 509 identifies a distance vector (or elevation vector (and floor info)) field, and detects the value of a first distance vector field.

In step 1111, the vector identification unit 509 identifies the speed of the mobile terminal 907 including the apparatus for identifying location information by using the period of time identified in step 1109. Namely, herein, first distance vector information represents a distance between the previous visible light communication module (e.g. the first visible light communication module 901) and the current visible light communication module (e.g. the second visible light communication module 902). Accordingly, by dividing the first distance vector information by the period of time, the speed of the mobile terminal 907 including the apparatus for identifying location information is calculated. A speed vector as calculated above is output to the location information output unit 307 (see FIG. 3), in step 1112. By repeating the process as described above, a movement vector value of the mobile terminal 907 including the apparatus for identifying location information may be identified by using the time trigger information and the distance vector information.

In step 1113, the vector identification unit 509 updates the DMS vector information identified in step 1106 by reflecting the period of time identified in step 1109 in the DMS vector information identified in step 1106. For example, when the DMS vector information identified in step 1106 is latitude 5d 5m 0.59s and the period of time identified in step 1109 is 6 seconds, in step 1113, the vector identification unit 509 updates the DMS vector information identified in step 1106 to latitude 5d 5m 6.59s. When encoding conversion is applied to latitude 5d 5m 6.59s, latitude 5d 5m 6.59s is converted into 10 00000100 000100 0110 111000.

Therefore, the vector identification unit 509 outputs the DMS vector information updated in step 1113 to the location information output unit 307 (see FIG. 3), in step 1114.

Meanwhile, in step 1115, the apparatus for identifying location information identifies whether a relevant visible light communication module is located last among the visible light communication modules which are located indoors. By identifying whether the value of a time trigger is set as 00, the vector identification unit 509 included in the visible light signal processor 500 may identify whether the relevant visible light communication module is located last among the visible light communication modules which are located indoors. Namely, when the value of the time trigger is set as 00, a value of 00 represents that no further visible light communication modules exist after the relevant visible light communication module, and thus the operation of the relevant visible light communication module is completed. When the value of the time trigger is set as 10, in order to identify location information of the mobile terminal 907 including the apparatus for identifying location information through the process as described above, the apparatus for identifying location information proceeds to step 1108.

Further, distance information may be identified by using a DMS distance conversion table as illustrated in Table 9 below. For example, when sec latitude as illustrated in Table 9 below is applied to 6 seconds, which is a period of time during movement of the mobile terminal between the light sources, 0.1 sec=3.08 m, and thus 6 sec=3.08 m 60=184.8 m. Accordingly, as an alternative to step 1110 of detecting a movement distance of the mobile terminal 907 including the apparatus for identifying location information by identifying a distance vector (or elevation vector (and floor info)) field from the control information 905, a movement distance of the mobile terminal 907 including the apparatus for identifying location information may be detected by using DMS vector information, as described above.

TABLE 9

| | | |
|---|---|---|
| degree | latitude | 0.00001 = 1.1 km |
| | longitude | 0.00001 = 0.9 m |
| minutes | latitude | 0.001 = 1.85 m |
| | longitude | 0.001 = 1.5 m |
| sec | latitude | 0.1 = 3.08 m |
| | longitude | 0.1 = 2.5 m |

Figure 12:
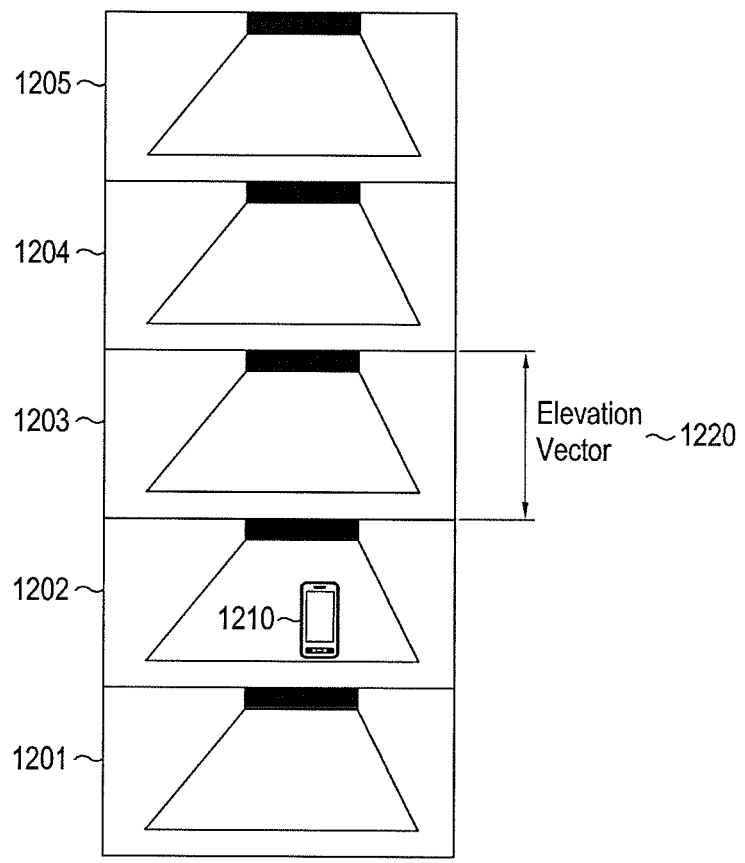
FIG. 12 is a third conceptual view illustrating a process of identifying location information by an apparatus for identifying location information according to an embodiment of the present invention.

FIG. 12 is a third conceptual view illustrating a process of identifying location information by an apparatus for identifying location information according to an embodiment of the present invention. FIG. 12 illustrates a case where the mobile terminal 907 including the apparatus for identifying location information moves in a vertical direction through an elevator in a building, instead of moving in a horizontal direction such as a movement in a tunnel.

Referring to FIG. 12, as an example, a visible light communication module is installed in each of first to fifth floors 1201, 1202, 1203, 1204 and 1205. When the value of a trigger field of control information that a mobile terminal 1210 including the apparatus for identifying location information receives from a visible light communication module is 01, a value of 01 represents elevation trigger information. Then, a value included in an elevation vector field is first read, and then a floor height at which the mobile terminal 1210 is currently located, is calculated by using the read value. When the elevation vector field is set to 3 feet, the value of the elevation vector field is 0000 0011. Also, when information on a floor number is 0000 0010, this information indicates that the mobile terminal 1210 is currently located at a floor height of 3 feet corresponding to the height of a second floor 1202. When the mobile terminal 1210 goes up to a third floor 1203, if the value of an elevation vector field is 5 feet and information on a floor number is 0000 0011, the mobile terminal 1210 identifies the information on the floor number, and compares the identified information on the floor number with the previous floor number. When a result of the comparison shows that the movement causes information on a floor number to change from 0000 0010 corresponding to information on the previous floor number to 0000 0011 corresponding to information on the current floor number, the mobile terminal 1210 analyzes that it goes up from the second floor 1202 to the third floor 1203. Accordingly, the mobile terminal 1210 first adds 5 feet corresponding to the value of the elevation vector field, which is received after the movement, to 3 feet corresponding to the previous value of the elevation vector field, and then displays the elevation vector field having a value obtained by the sum. Then, 8 feet which is obtained by adding 5 feet corresponding to the current value of the elevation vector field to 3 feet corresponding to the previous value of the elevation vector field, becomes the floor height of the third floor 1203 where the mobile terminal 1210 is currently located. In contrast, when the mobile terminal 1210 moves from the second floor 1202 to the first floor 1201, if the mobile terminal 1210 is currently located on the first floor 1201 after it identifies a floor height of 3 feet and 0000 0001 corresponding to information on a floor number, due to the movement from the third floor 1203, where the mobile terminal 1210 has previously been located, to the first floor 1201, information on a floor height becomes 3 feet. Also, it can be noted that floor height information on the second floor 1202 is obtained by 8 feet 3 feet=5 feet.

Further, after height information from the ground is previously input to a memory included in a visible light communication module and a light source installed on each floor or the height of each floor is previously stored in the memory, the previously-stored information may be provided to the mobile terminal 1210 by using forward information.

An exemplary embodiment of the present invention as described above has described an example where the visible light communication module transmits a visible light signal to the apparatus for identifying location information and the apparatus for identifying location information identifies location information by using information included in the visible light signal. However, the present invention is not limited to this example. For example, the apparatus for identifying location information may send a request for a visible light signal, which is used to identify location information, to the visible light communication module which provides a visible light signal. Then, the visible light communication module basically maintains a state where it does not provide the visible light signal for identifying location information. When the visible light communication module receives a request for a visible light signal for identifying the location information, it may transmit the visible light signal for identifying the location information in response to the received request. Also, the visible light communication module basically maintains an idle state where it does not transmit a visible light signal. When the visible light communication module receives a request for a visible light signal for identifying the location information, it may initiate an operation for transmitting the visible light signal in response to the received request. As described above, only when the visible light communication module receives a request from the mobile terminal, it transmits a visible light signal for identifying location information, or initiates an operation for transmitting a visible light signal. Accordingly, it is possible to reduce the unnecessary use of communication resources or the unnecessary consumption of electric power.

Also, a location tracking apparatus according to the present invention, can accurately measure the location of a mobile terminal even in an area where a GPS signal cannot be received.

Although the present invention has been shown and described with reference to the exemplary embodiments and the accompanying drawings, the present invention is not limited to these exemplary embodiments. Also, it goes without saying that it is apparent to a person having ordinary knowledge in the technical field, to which the present invention pertains, that various changes and modifications can be made in the exemplary embodiments without departing from the scope of the present invention. Therefore, the spirit and scope of the present invention is not limited to the described embodiments thereof, but is defined by the appended claims and equivalents thereof.

The invention claimed is:

1. An apparatus for identifying location information, the apparatus comprising:
    a global positioning system (GPS) signal processor configured to receive a GPS signal and identify location information;
    a visible light signal processor configured to receive a visible light signal and identify location information;
    a GPS/visible light selector configured to identify strengths of signals provided by the GPS signal processor and the visible light signal processor and control an operation of the GPS signal processor and an operation of the visible light signal processor; and
    a location information output unit configured to output the location information identified by the GPS signal processor and the visible light signal processor,
    wherein the visible light signal processor is configured to provide a strength of the received visible light signal to the GPS/visible light selector and to identify visible light signal-based location information based on the received visible light signal.

2. The apparatus as claimed in claim 1, wherein the GPS signal processor comprises:
    a radio frequency (RF) unit configured to process a RF signal;
    a demodulation unit configured to demodulate a signal provided by the RF unit and identify location information; and
    a GPS signal detection unit configured to detect a GPS signal from the demodulated signal and provide the GPS signal to the GPS/visible light selector.

3. The apparatus as claimed in claim 1, wherein the visible light signal processor comprises:
    a light reception unit configured to receive the visible light signal, and convert the received visible light signal into an electrical signal;
    a demodulation unit configured to demodulate the converted signal;
    a light signal strength detection unit configured to identify a strength of a light signal from a signal provided by the demodulation unit and provide the identified strength of the light signal to the GPS/visible light selector; and
    a location information identification unit configured to detect control information from a signal provided by the demodulation unit and identify the visible light signal-based location information based on the control information.

4. The apparatus as claimed in claim 3, wherein the location information identification unit comprises:
    a timer configured to identify a period of time from a time point of receiving trigger information, in response to reception of the trigger information included in the control information; and
    a location vector identification unit configured to identify location information using time information identified by the timer and the control information.

5. The apparatus as claimed in claim 4, wherein the location vector identification unit is configured to detect a speed vector using the time information identified by the timer and output the speed vector.

6. The apparatus as claimed in claim 4, wherein the control information comprises:
    an identifier used to discriminate between visible light communication modules;
    the trigger information for controlling an operation of the timer included in a mobile terminal;
    distance vector information indicating a distance from a near visible light communication module; and
    VLC enabler information for controlling an operation of a visible light communication module.

7. The apparatus as claimed in claim 6, wherein the control information further comprises DMS vector information indicating a latitude and a longitude of the visible light communication module.

8. The apparatus as claimed in claim 7, wherein the DMS vector information is included in the control information provided by all visible light communication modules included in a GPS shadow area.

9. The apparatus as claimed in claim 8, wherein the location vector identification unit is configured to identify location information using the DMS vector information indicating the latitude and the longitude of the visible light communication module.

10. The apparatus as claimed in claim 7, wherein the DMS vector information is included in the control information provided by a visible light communication module, which is included in the GPS shadow area and with which the mobile terminal first communicates.

11. The apparatus as claimed in claim 10, wherein the location vector identification unit is configured to identify location information using the DMS vector information indicating the latitude and the longitude of the visible light communication module and the time information identified by the timer.

12. The apparatus as claimed in claim 1, wherein the GPS/visible light selector is configured to monitor a strength of a signal received from the GPS signal processor.

13. The apparatus as claimed in claim 12, wherein the GPS/visible light selector is configured to transmit a control signal indicating initiation of an operation of the visible light signal processor to the visible light signal processor, in response to the strength of the signal received from the GPS signal processor being equal to or less than a predetermined reference value.

14. A method for identifying location information of a mobile terminal in a GPS shadow area, the method comprising:
receiving a visible light communication signal including control information from a visible light communication module fixed at a predetermined location;
detecting the control information from the visible light communication signal;
identifying time information indicating a period of time, during which the mobile terminal moves from an area, where a first visible light communication module is located, to an area, where a second visible light communication module is located, using trigger information included in the control information;
identifying distance information indicating a movement distance of the mobile terminal, using distance vector information included in the control information; and
identifying speed information of the mobile terminal using the time information and the distance information.

15. The method as claimed in claim 14, wherein the control information comprises:
an identifier used to discriminate between visible light communication modules;
the trigger information for controlling an operation of a timer included in the mobile terminal;
distance vector information indicating a distance from a near visible light communication module; and
VLC enabler information for controlling an operation of a visible light communication module.

16. The method as claimed in claim 15, wherein the control information further comprises DMS vector information indicating a latitude and a longitude of the visible light communication module.

17. The method as claimed in claim 16, wherein the DMS vector information is included in the control information provided by all visible light communication modules included in the GPS shadow area.

18. The method as claimed in claim 17, further comprising identifying location information including a latitude and a longitude of the mobile terminal, using the DMS vector information.

19. The method as claimed in claim 16, wherein the DMS vector information is included in the control information provided by a visible light communication module, which is included in the GPS shadow area and with which the mobile terminal first communicates.

20. The method as claimed in claim 18, further comprising:
identifying initial location information including the latitude and the longitude of the mobile terminal using the DMS vector information included in the control information provided by a visible light communication module, with which the mobile terminal first communicates; and
identifying location information including a latitude and a longitude of the mobile terminal moving in the GPS shadow area, after reflecting the time information in the DMS vector information.

21. The method as claimed in claim 15, wherein the trigger information comprises:
a time trigger indicating initiation of an operation of the timer;
an elevation trigger indicating initiation of identification of elevation information;
a time/elevation trigger indicating initiation of identification of the timer and the elevation information; and
a timer completion trigger indicating completion of an operation for identifying the timer and the elevation information.

22. The method as claimed in claim 15, wherein the control information further comprises elevation vector information indicating an elevation difference between a near visible light communication module and the mobile terminal.

23. The method as claimed in claim 14, further comprising identifying a strength of a signal received from a GPS signal processor for receiving a GPS signal and identifying location information.

24. The method as claimed in claim 23, further comprising directing initiation of an operation of a visible light signal processor to the visible light signal processor, in response to the strength of the signal received from the GPS signal processor, which is equal to or less than a predetermined reference value.

25. A method for identifying location information of a mobile terminal in a GPS shadow area, the method comprising:
transmitting a visible light communication signal including control information to the mobile terminal through a visible light communication module fixed at a predetermined location, by a server for providing information required to identify the location information of the mobile terminal,
wherein the control information comprises:
an identifier used to discriminate between visible light communication modules;
trigger information for controlling an operation of a timer included in the mobile terminal;
distance vector information indicating a distance from a near visible light communication module; and
VLC enabler information for controlling an operation of a visible light communication module.

26. The method as claimed in claim 25, wherein the control information further comprises DMS vector information indicating a latitude and a longitude of the visible light communication module.

27. The method as claimed in claim 26, wherein the DMS vector information is included in the control information provided by all visible light communication modules included in the GPS shadow area.

28. The method as claimed in claim 27, further comprising identifying location information including a latitude and a longitude of the mobile terminal, using the DMS vector information.

29. The method as claimed in claim 26, further comprising:
receiving a GPS signal, by a GPS signal processing module which is included in the server, and receives and processes the GPS signal;
identifying the DMS vector information of the visible light communication module from the GPS signal, by the GPS signal processing module; and
generating the control information including the DMS vector information, by the GPS signal processing module.

30. The method as claimed in claim 29, wherein the DMS vector information is included in the control information provided by a visible light communication module, which is included in the GPS shadow area and with which the mobile terminal first communicates.

31. The method as claimed in claim 25, wherein the trigger information comprises:
a time trigger indicating initiation of an operation of the timer;
an elevation trigger indicating initiation of identification of elevation information;
a time/elevation trigger indicating initiation of identification of the timer and the elevation information; and
a timer completion trigger indicating completion of an operation for identifying the timer and the elevation information.

32. The method as claimed in claim 25, wherein the control information further comprises elevation vector information indicating an elevation difference between a near visible light communication module and the mobile terminal.

33. The method as claimed in claim 25, further comprising:
receiving a request for the control information from the mobile terminal; and
initiating an operation for transmitting the control information by the visible light communication module, in response to the request for the control information.

* * * * *